United States Patent
White et al.

(10) Patent No.: US 7,088,260 B2
(45) Date of Patent: Aug. 8, 2006

(54) HIGH SPEED DATA COMMUNICATION PROTOCOL FOR USE WITH EM DATA TELEMETRY ANTENNAE

(75) Inventors: Matthew Robert White, Calgary (CA); Victor Koro, Calgary (CA); Michael T. Sutherland, Calgary (CA); David Sim, Calgary (CA)

(73) Assignee: Ryan Energy Technologies, Calgary (CA)

( * ) Notice: Subject to any disclaimer, the term of this patent is extended or adjusted under 35 U.S.C. 154(b) by 307 days.

(21) Appl. No.: 10/797,739

(22) Filed: Mar. 10, 2004

(65) Prior Publication Data

US 2005/0200496 A1   Sep. 15, 2005

(51) Int. Cl.
*G01V 3/00* (2006.01)

(52) U.S. Cl. ............ 340/854.6; 343/718; 343/767; 439/730; 175/320

(58) Field of Classification Search ............ 340/854.6; 175/320; 439/730; 343/718, 767
See application file for complete search history.

(56) References Cited

U.S. PATENT DOCUMENTS 5,138,313 A * 8/1992 Barrington ............ 340/854.6
5,163,714 A   11/1992 Issenmann
6,050,353 A   4/2000 Logan

FOREIGN PATENT DOCUMENTS

CA   2151525 A1   12/1996

* cited by examiner

*Primary Examiner*—Albert K. Wong
(74) *Attorney, Agent, or Firm*—Barnes & Thornburg LLP

(57) ABSTRACT

A communication method for retrieving stored data from an MWD tool, through an antenna used for conventional EM data telemetry. The method comprises establishing electrical contact between a surface transceiver and an EM data telemetry antenna upon retrieval to the surface. The MWD tool then transfers data through the antenna, the data being received by the surface transceiver. Also provided is an electrical isolation connector subassembly comprising an electrically insulative coating to electrically isolate the split-sub components, thereby forming the antenna for data transfer and EM data telemetry.

13 Claims, 3 Drawing Sheets

HIGH SPEED DATA COMMUNICATION PROTOCOL FOR USE WITH EM DATA TELEMETRY ANTENNAE

FIELD OF THE INVENTION

This invention relates to a method of using an antenna normally designed for conventional EM data telemetry to transmit a second higher-speed data signal from an MWD tool to a surface transceiver upon return of the drill string to the surface.

BACKGROUND OF THE INVENTION

The transmission of electromagnetic signals from a borehole to the earth surface is an effective method of communicating information during various types of drilling operations, such as measuring while drilling (MWD) and/or logging well drilling (LWD). During directional drilling operations, such as boring holes under river beds, subways, unusual earth formations and tapping oil reservoirs, it is particularly important at all times to know precisely the location of the drill bit. A significant effort has been made to develop electrical instruments which are capable of transmitting signals at the drill face or inspection face back to the earth's surface.

A number of systems have been developed which incorporate electromagnetic technology for communicating to the earth surface. For example, in U.S. Pat. No. 5,394,141 to Soulier, described is a system where the lower portion of the drill string is used as an antenna for purposes of transmitting electromagnetic waves carrying information.

In order to enhance communication with the earth's surface, it is preferred to electrically isolate drill string components so that electromagnetic signals can be developed for data telemetry. This is achieved by using a subassembly connector which electrically isolates adjacent drill string components. The isolated components provide the two terminals of an antenna to which an alternating current is applied. This develops the electromagnetic signal for transmission of data to the earth's surface. Examples of such connectors are described in U.S. Pat. No. 6,050,353 to Ryan Energy, U.S. Pat. No. 5,138,313 to Haliburton Company, U.S. Pat. No. 5,163,714 to Geoservice and Canadian patent application 2,151,525 to McAllister Petroleum Services, Ltd.

During directional drilling, the MWD tool measures and transmits basic direction heading data for the purpose of controlling the drilling operation. In addition, the MWD tool collects and stores additional data (i.e. regarding the surrounding geology) that has traditionally been retrieved through a multi-pin connector located at the end of the tool. For this to happen, the tool must be first returned to surface and pulled from the drill collar, after which it is connected to a computer for retrieval of the data. This is a time-consuming and labour intensive process, as it requires disassembly of the drill string. Transmission of this data using traditional data telemetry technology is not practical as the rate of transmission is too slow (i.e. 2 to 3 bits/second). There is clearly a need for an alternate data communication method that allows for higher-speed data retrieval without the labour intensive step of drill string disassembly.

It has also been found that during drilling operations, the drill string is subjected to extreme torsional compression, tension, and bending moments. Such extreme forces can result in connector failure, usually at the weakest point in the subassembly. The connectors of patents and patent application noted above may fail due to overstressing and possibly break up at their weakest point. There is therefore also the need for a connector with enhanced strength characteristics to handle the drilling forces and torques experienced during operation. Consequently, there is a need for a subassembly connector that is capable is withstanding the various forces experienced during drilling, while also electrically isolating adjacent regions to permit the transmission of data via either of the two communication methods discussed above.

SUMMARY OF THE INVENTION

Broadly stated, the present invention provides method of using an antenna normally designed for conventional EM data telemetry to transmit a second higher speed data signal from an MWD tool to a surface transceiver upon return of the drill string to the surface.

In accordance with an aspect of this invention, provided is a method for retrieving stored data from an MWD tool, through an antenna used for conventional EM data telemetry, the method comprising the steps of:

a) establishing electrical contact of a surface transceiver with respect to first and second electrically isolated regions defining said antenna to permit communication with said MWD tool, b) initiating said MWD tool to transfer data through said antenna to said surface transceiver;

c) receiving transmitted signals in said surface transceiver.

In accordance with an aspect of this invention, provided is an electrical isolation connector subassembly for interconnecting adjacent tubular drill rods of a drill string, said connector comprising two electrically isolated splitsub components electrically separated by an electrically insulative coating applied to mating surfaces therebetween, said two electrically isolated splitsub components forming an antenna for use in conventional downhole data telemetry, said electrically isolated splitsub components further permitting transmission of data signals through said antenna from an MWD tool contained within said drill string upon retrieval to the surface, without the need for disassembly and direct connection to said MWD tool.

DETAILED DESCRIPTION OF THE PREFERRED EMBODIMENTS

Various aspects of the invention are described in detail where it is appreciated that the principles of the invention, as established in the detailed description of the drawings, may find application for use in data communication during directional drilling operations. This invention relates to a method of using an antenna normally designed for conventional EM data telemetry to transmit a second higher speed data signal from an MWD tool. The method involves establishing a physical connection between the antenna and a surface transceiver upon return of the drill string to the surface. This method enables data transfer without the need for direct access to the MWD tool.

Conventional data telemetry allows for data to be communicated to the surface of a borehole while the drill string is still downhole, allowing the user to direct the drill string during operation. This is generally accomplished by electrically isolating drill rod components so as to form an antenna, preferably adjacent the location of the drill bit. The antenna transmits low frequency electromagnetic data signals to the earth surface that are interpreted and used for various informational purposes, such as for the inspection and evaluation of bore holes. The present invention uses the same antenna to transmit data signals by implementing a second high freuqency communication protocol. Upon retraction of the drill string to the surface, electrodes, or electrically conductive C-clamps, are placed in contact with each electrically isolated drill rod component, or the drill collar segments connected thereto, thereby allowing communication between the internally located MWD tool and a surface transceiver. This method of communicating stored data mitigates the need to dismantle the drill string, saving both time and cost.

Figure 1:
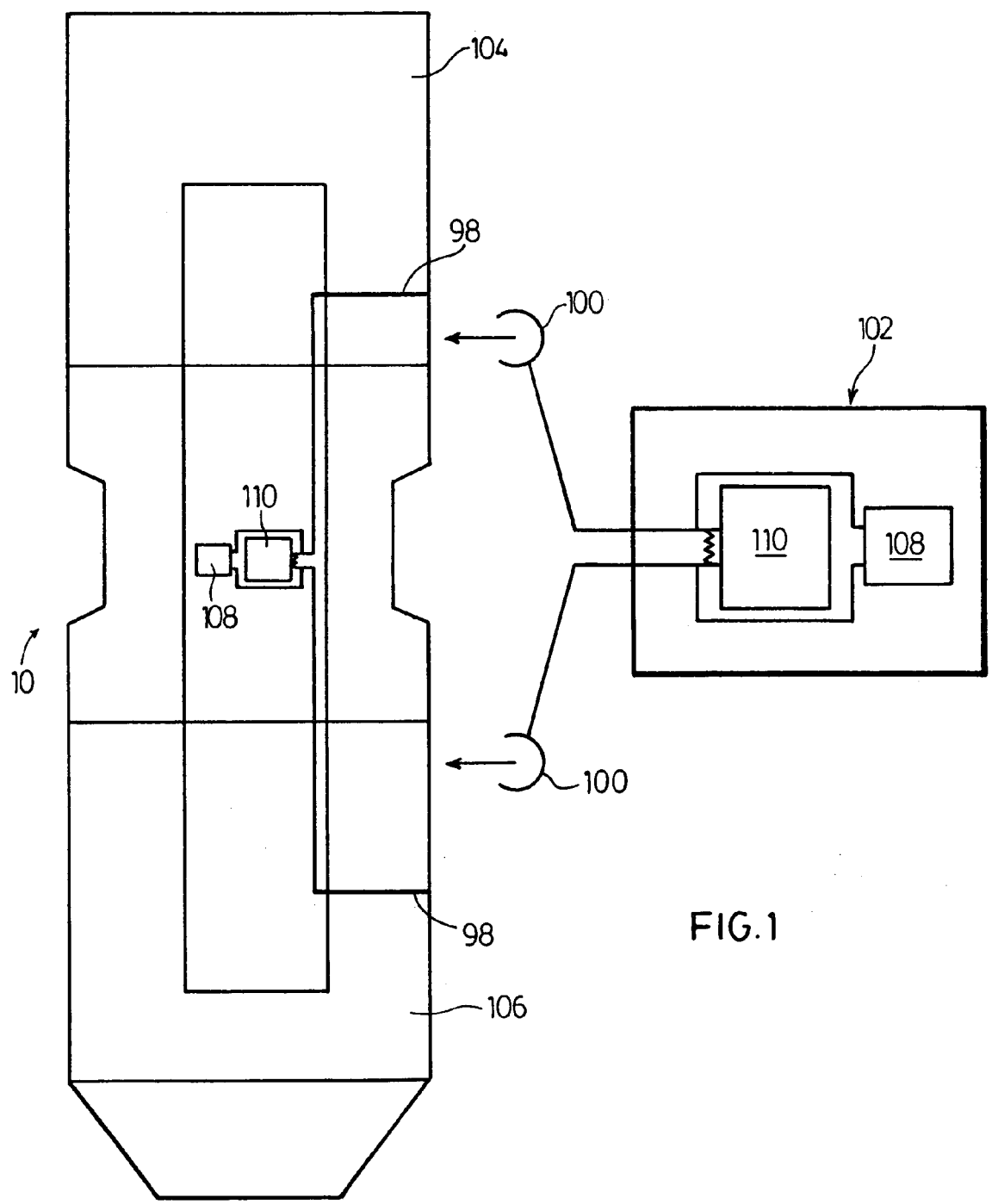
FIG. 1 is a schematic drawing outlining the general concept of the present invention.

In the present invention, the MWD tool located within a drill string is additionally electronically configured for asynchronous serial communication through the EM data telemetry antenna. Examples of communication protocols that can be used are RS-422, RS-485, RS-232 plus many other half duplex protocols. It may also be possible to use low voltage differential signaling (LVDS) protocols. To form the antenna, an electrical isolation connector subassembly is generally used. As shown in FIG. 1, the additional circuitry delivers the communication signals through the same output contacts 98 as the EM data telemetry signals, but is capable of doing so at a much higher rate. To receive the signal, electrodes 100, or C-clamps from a surface transceiver 102 are connected to the electrical isolation connector subassembly 10, or the respective drill strings connected thereto 104, 106, spanning across the antenna. This contact simply requires physical contact, eliminating the need for dedicated surface mounted connectors. This feature is particularly advantageous as the elimination of surface mounted connectors removes potential problems associated with damage and wear in this area. It also simplifies the connection process, as the electrodes used can be any suitable electrically conductive element, such as electrically conductive tape. The MWD tool 58 and the surface transceiver 102 are each fitted with a current drive circuit 108 and a differential sensing circuit 110 such that when connected together, a current loop is established across the antenna. This current loop is used for data communication using a master/slave control sequence. When the MWD tool is retracted to the surface, it will finish any survey data transmission in progress and then enable a receiver and wait for the surface transceiver to transmit a request for information. The surface transceiver serves as the master and the MWD tool as the slave. Upon recognition that the transceiver is in position, the MWD tool begins communication at a rate well below the maximum transmission rate until the transceiver requests a speed increase. Once a command is received for a speed increase, the slave at the current communication speed will send an acknowledgement and then both the slave and master will switch to the new speed defined by the master. If after a short period the slave receives no further commands, it will return to the previous speed and wait for further commands. If the master attempts to communicate to the slave with no response after 3 tries, it will return to the previous communication speed, wait a short time and try again. In this way, the maximum attainable data rate can be achieved before large data transmission begins.

It would be understood by one skilled in the art that the maximum attainable speed of data transfer is at least partially dependent on the electrical properties of the electrical isolation connector subassembly. For maximum speed of data transfer, an electrical isolation connector subassembly of small capacitance and large resistance is desired. For communication at any given baud rate, it can be appreciated that one skilled in the art would readily understand what values for these parameters are required. It is generally accepted that to communicate using the method of the present invention, a minimum resistance of 10 Ohms is required. With respect to capacitance, it is generally accepted that for a baud rate of 9600, the isolation sub should not have a capacitance of greater than 1.00E-06 Farads. Table 1 shows generally accepted maximum capacitance values for a range of baud rates. Due to the variety of isolation subs that may find application using the present invention, it is recommended that actual experimentation be conducted to ascertain the exact values for these parameters. This is generally accomplished by measuring the shunt capacitance and resistance across the gap, measurements readily attainable by one skilled in the art using, for example, a multi-meter.

TABLE 1

Generally accepted maximum capacitance values for specified baud rates.

| Baud Rate | Maximum Capacitance |
| --- | --- |
| 9600 | 1.00E-06 |
| 19200 | 5.00E-07 |
| 56000 | 1.00E-07 |
| 115200 | 1.00E-07 |
| 256000 | 5.00E-08 |
| 512000 | 1.00E-08 |
| 1024000 | 1.00E-08 |

Figure 2:
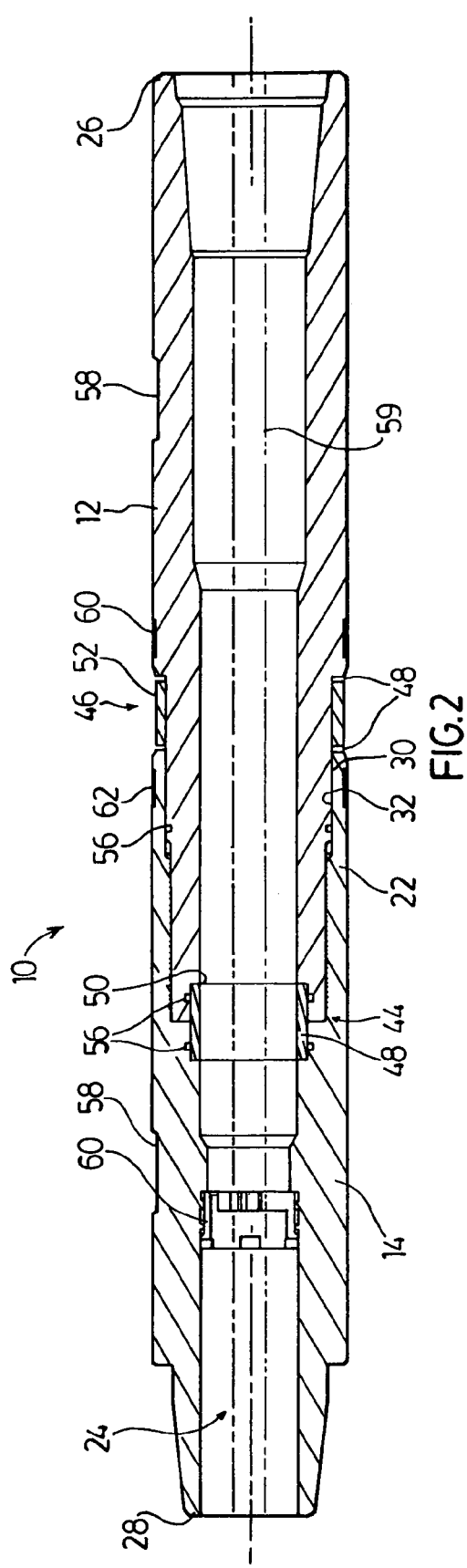
FIG. 2 is a section through the electrical isolation connector subassembly of the present invention.
Figure 4:
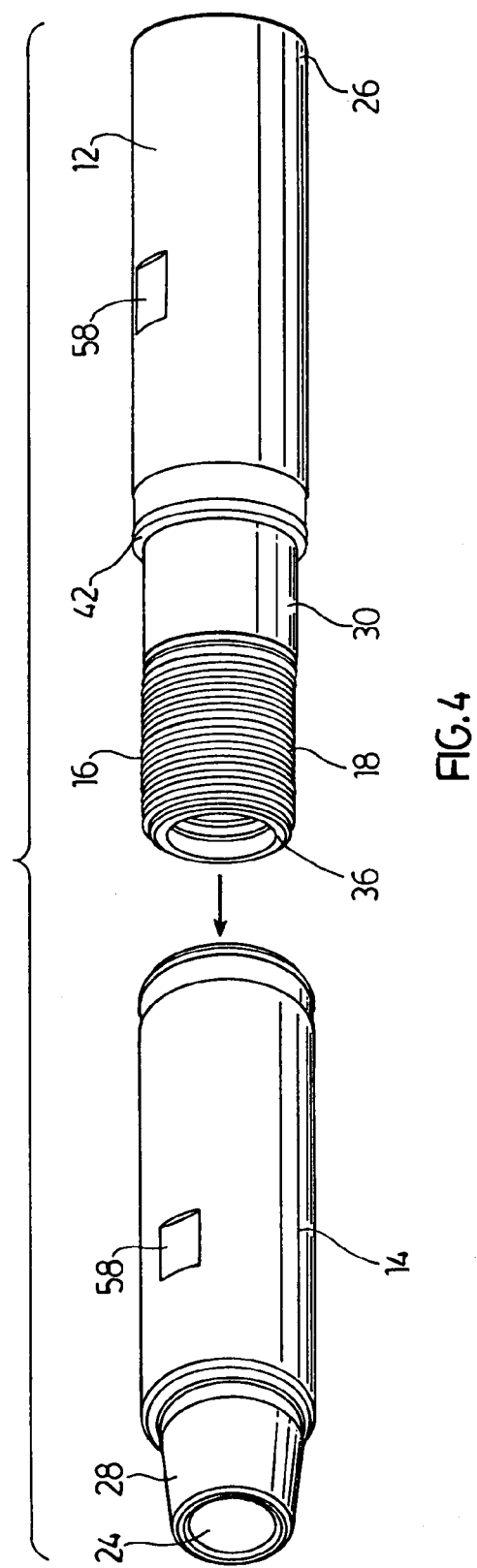
FIG. 4 is a perspective exploded view of the embodiment shown in FIG. 1.
Figure 3:
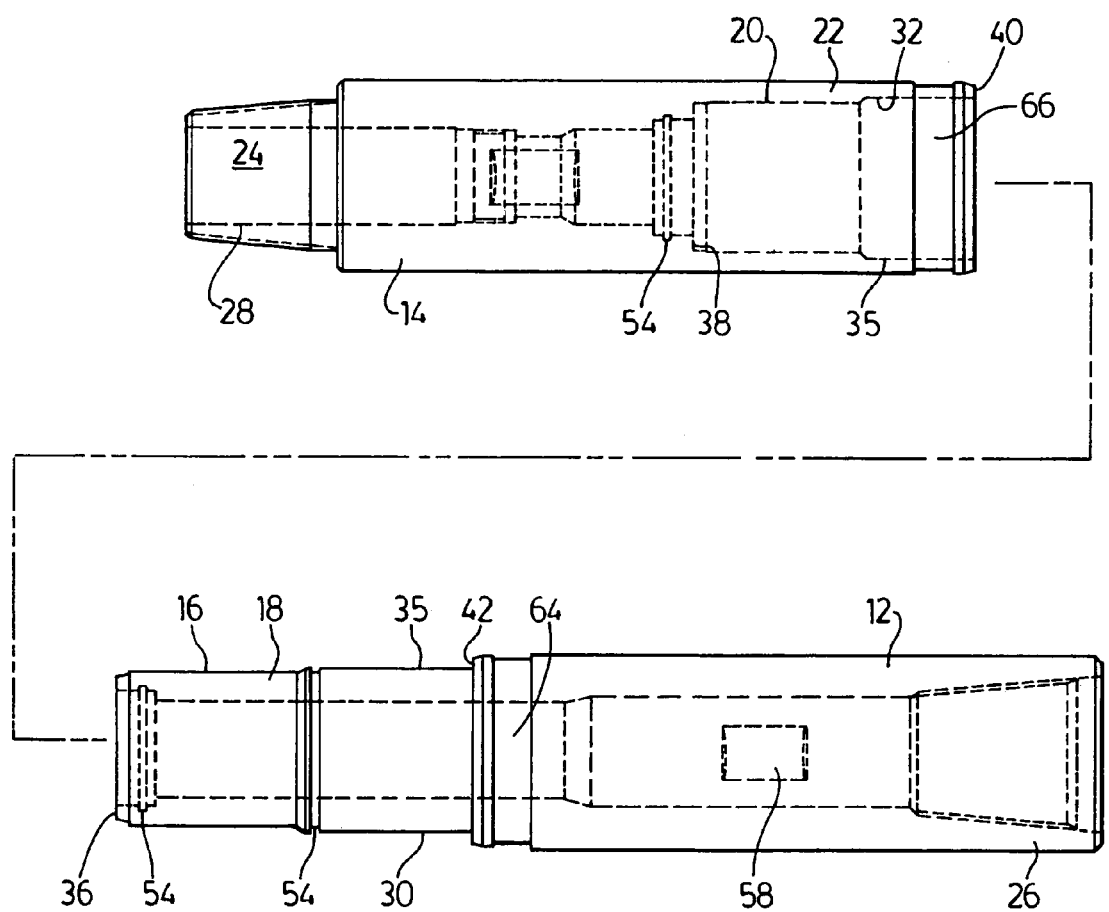
FIG. 3 is a sectional exploded view of the embodiment shown in FIG. 1.

An electrical isolation connector subassembly particularly suitable for use with the method of the present invention will now be discussed with reference to FIGS. 2, 3 and 4. An electrical isolation connector subassembly generally comprises a first electrically isolated component and a second electrically isolated component, the two electrically isolated components being separated by an insulative material. As will be discussed in more detail, the insulative material used in the preferred embodiment is an insulative coating applied to the threads that mechanically connect the two electrically isolated components to form the electrical isolation connector subassembly. FIG. 2 shows an assembled electrical isolation connector subassembly 10, ready for installation into a drill string. The electrical isolation connector subassembly 10 generally comprises a first electrically isolated splitsub component 12, and a second electrically isolated splitsub component 14. Electrically isolated splitsub components 12 and 14 mechanically engage each other using threads. Referring to FIG. 3, electrically isolated splitsub component 12 is machined with threads 16 on an outside surface of male-end 18, whereas electrically isolated splitsub component 14, is machined with threads 20 on an inside surface of female-end 22. It can be appreciated that while FIGS. 2, 3 and 4 show a standard pipe-thread configuration, one skilled in the art could implement any substitute thread configuration offering the necessary mechanical qualities necessary for operation of the current invention. Electrical isolation connector subassembly 10 further comprises a longitudinal bore 24, a first coupling end 26, and a second coupling end 28. First coupling end 26 is adapted to connect to a first drill string component, with second coupling end 28 being adapted to connect to a second drill string component. To enhance the overall mechanical strength characteristic of the electrical isolation connector subassembly 10, electrically isolated splitsub components 12 and 14 are machined with elongated mating surfaces 30 and 32, respectively. In an assembled electrical isolation connector subassembly, electrically isolated splitsub components 12 and 14, which are of circular cross-section and of the same outside diameter, are positioned coaxial about the longitudinal axis 34.

To electrically isolate the electrically isolated splitsub components 12 and 14, an insulative coating 35 is applied to both the outside surface of male end 18 of electrically isolated splitsub component 12, and the inside surface of female end 22 of electrically isolated splitsub component 14. More specifically, threads 16 and 20, elongated mating surfaces 30 and 32, as well as end wall 36 and shoulder 42 of electrically isolated splitsub component 12, and shoulder 38 and end wall 40 of electrically isolated splitsub component 14, are coated with an electrically insulative coating. The electrical isolation connector subassembly 10 is further configured to receive insulative rings at both the internal gap 44 and external gap 46, so as to prevent current leakage at these points. At the internal gap 44, there is an internal insulator ring 48, positioned within a recess 50 machined across the internal gap 44 of electrically isolated splitsub components 12 and 14. This recess 50 is also coated with the insulative coating. At external gap 46, the female end 22 of the electrically isolated splitsub component 14 is shortened so as to define an annular space in the assembled electrical isolation connector subassembly 10, in which an external insulator ring 52 is positioned. To ensure secure placement of this external insulator ring 52, compression bushings 48 may be used that compress against the external insulator ring 52 during assembly. In addition, to prevent ingress of drilling mud into the threadforms and the adjacent areas, the electrical isolation connector subassembly 10 may be configured with circumferential box-shaped grooves 54 to receive o-rings 56. To permit labelling of the electrically isolated splitsub components 12 and 14, each is machined with a recessed flat surface 58. To each side of the external gap 46, there are wear shoulders 60, 62, the wear shoulders being received in respective circumferential recesses 64, 66 machined into respective electrically isolated splitsub components 12 and 14.

The electrically insulative coating of the preferred embodiment is a binary composition comprising a molten ceramic and a fluoropolymer. The ceramic coating provides sufficient mechanical loading capacity to withstand drilling force and torques and carries the loading across the connection threads. The fluoropolymer acts as a sealant since the ceramic material is generally porous and therefore not effective as an insulative barrier alone, under the conditions used during directional drilling. The qualities of the binary composition are largely responsible for the resistance characteristics of the subassembly, whereas the capacitance appears to be less affected by the ceramic component, and appears to be function of the sealant chosen for the binary composition. The polymer sealant used may be Teflon, polyether sulfones, polyimides, polyamides, polyethylene and fluoropolymer variants.

Contained within the electrical isolation connector subassembly 10, and extending beyond each end into the respective connected drill strings, is the MWD tool 59 which houses the electronics responsible for collecting, storing and transmitting data. The MWD tool is positioned within the longitudinal bore, seated within a spider assembly 60. Each of the electrically isolated splitsub components 12 and 14 is connected to the MWD tool, thereby establishing an antenna for the propagation of EM signals used for downhole communication. To operate in conventional EM data telemetry mode, an alternating signal is applied to the electrically isolated splitsub components 12 and 14 in the manner described in U.S. Pat. No. 5,138,313 to Barrington and U.S. Pat. No. 5,163,714 to Issenmann.

With the incorporation of an additional communication protocol, the electrical isolation connector subassembly described above is capable of two communication transmission modes. The first mode is signal transmission while in downhole service back to the surface receiver. Signalling in this mode occurs at low frequency and over long distances. The second mode occurs at a high frequency through a physical connection to a transceiver when at the surface.

In an alternate embodiment of the present invention, conventional EM isolation subs having sufficiently high resistance and sufficiently low capacitance are used in combination with the MWD tool of the present invention to deliver communication signals through the same output contacts as EM data telemetry signals. An example of a conventional EM sub that can be used is disclosed in Canadian Patent Application No. 2,420,402 to Sutherland et al. As mentioned above, the maximum speed of data transfer will be a function of the electrical properties of the isolation sub.

Although preferred embodiments of the invention have been described herein in detail, it will be understood by those skilled in the art that variations may be made thereto without departing from the spirit of the invention or the scope of the appended claims.

What is claimed is:

1. A method for retrieving stored data from an MWD tool, through an antenna used for conventional EM data telemetry, the method comprising the steps of:
    a) establishing electrical contact of a surface transceiver with respect to first and second electrically isolated regions defining said antenna to permit communication with said MWD tool,
    b) initiating said MWD tool to transfer data through said antenna to said surface transceiver;
    c) receiving transmitted signals in said surface transceiver.

2. The method according to claim 1, wherein said electrodes are c-clamps.

3. The method according to claim 1, wherein said signals are transmitted by asynchronous serial communication.

4. An electrical isolation connector subassembly for interconnecting adjacent tubular drill rods of a drill string, said connector comprising two electrically isolated splitsub components electrically separated by an electrically insulative coating applied to mating surfaces therebetween, said two electrically isolated splitsub components forming an antenna for use in conventional downhole data telemetry, said electrically isolated splitsub components further permitting transmission of data signals through said antenna from an MWD tool contained within said drill string upon retrieval to the surface, without the need for disassembly and direct connection to said MWD tool.

5. The electrical isolation connector subassembly of claim 4, wherein the electrically insulative coating comprises a ceramic base and a polymer sealant.

6. The electrical isolation connector subassembly of claim 5, wherein the polymer sealant is selected from the group consisting of fluoropolymer, polyether sulfones, polyimides, polyamides, polyethylene, and fluoropolymer variants.

7. The electrical isolation connector subassembly of claim 4, wherein electrodes are attached to each of said two electrically isolated splitsub components to permit said transmission of data signals to a surface transceiver.

8. The electrical isolation connector subassembly of claim 4, wherein said data signals are transmitted by an asynchronous serial communication.

9. The electrical isolation connector subassembly of claim 4, wherein said transmission of data signals uses a master/slave communication protocol.

10. The electrical isolation connector subassembly of claim 4, wherein said transmission of data signals is initiated by said surface transceiver.

11. The electrical isolation connector subassembly of claim 10, wherein said surface transceiver sends a request for information signal to initiate communication.

12. The electrical isolation connector subassembly of claim 4, wherein the electrically isolated splitsub components are interconnected by threaded engagement.

13. The electrical isolation connector subassembly of claim 4, wherein the subassembly is adapted to receive seals to thereby prevent ingress of drilling mud into subassembly.

* * * * *